(12) United States Patent
Blossey et al.

(10) Patent No.: US 8,435,338 B2
(45) Date of Patent: May 7, 2013

(54) INTAKE AIR FILTER FOR INTERNAL COMBUSTION ENGINES

(75) Inventors: Werner Blossey, Benningen (DE); Mario Rieger, Freiberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/130,466

(22) PCT Filed: Nov. 16, 2009

(86) PCT No.: PCT/EP2009/065213
§ 371 (c)(1),
(2), (4) Date: Jul. 13, 2011

(87) PCT Pub. No.: WO2010/057845
PCT Pub. Date: May 27, 2010

(65) Prior Publication Data
US 2011/0259199 A1  Oct. 27, 2011

(30) Foreign Application Priority Data
Nov. 20, 2008 (DE) .................. 20 2008 015 438 U

(51) Int. Cl.
*B01D 46/46* (2006.01)

(52) U.S. Cl.
USPC ........... 96/414; 55/385.3; 55/DIG. 34; 95/26; 96/417; 116/DIG. 25

(58) Field of Classification Search ..... 95/26; 55/385.1, 55/385.3, DIG. 34; 96/419, 421, 424; 116/70, 116/112, 276, 137 R, DIG. 42; 210/90, 138
See application file for complete search history.

(56) References Cited

U.S. PATENT DOCUMENTS

| | | | | |
|---|---|---|---|---|
| 3,639,998 A | * | 2/1972 | Mason | 34/82 |
| 3,928,006 A | * | 12/1975 | Martineau | 96/418 |
| 4,020,525 A | * | 5/1977 | Fromknecht et al. | 15/339 |
| 4,233,597 A | * | 11/1980 | Kurz | 340/626 |
| 6,837,922 B2 | * | 1/2005 | Gorin | 96/419 |
| 7,503,962 B2 | * | 3/2009 | Attar | 96/417 |
| 7,594,960 B2 | * | 9/2009 | Johansson | 96/417 |
| 7,621,978 B2 | * | 11/2009 | Johansson | 95/26 |

FOREIGN PATENT DOCUMENTS

| | | |
|---|---|---|
| DE | 102005013672 | 9/2006 |
| EP | 1693098 A1 | 8/2006 |
| EP | 1772180 A2 | 4/2007 |
| FR | 2879944 A1 | 6/2006 |
| GB | 2377622 A | 1/2003 |

OTHER PUBLICATIONS

DPMA Search report of 20 2008 015 438.3; PCT search report (with PCT publication) of PCT/EP2009/065213.

* cited by examiner

*Primary Examiner* — Duane Smith
*Assistant Examiner* — Minh-Chau Pham
(74) *Attorney, Agent, or Firm* — James Hasselbeck

(57) ABSTRACT

The intake air filter (10) according to the invention is for cleaning intake air for internal combustion engines, in particular in vehicles. To this end, the intake air filter (10) includes an openable housing (11) with an inlet (16) and an outlet (17). Disposed between the inlet (16) and the outlet (17) is a filter element (18). In order to check, when the housing (11) is closed, whether a correct filter element (18) has been properly installed, a filter element identification device is provided, which, designed as a dome (28), corresponds to an additional opening (29) in the housing (11).

9 Claims, 3 Drawing Sheets

INTAKE AIR FILTER FOR INTERNAL COMBUSTION ENGINES

CROSS REFERENCE TO RELATED APPLICATIONS

This application is US National Stage Entry of international patent application no. PCT/EP2009/065213, filed Nov. 16, 2009 designating the United States of America, the entire disclosure of which is incorporated herein by reference. Priority is claimed based on Federal Republic of Germany patent application no. 20 2008 015 438.3, filed Nov. 20, 2008.

TECHNICAL FIELD

The present invention concerns an intake air filter.

PRIOR ART

EP 0 470 330 discloses an intake air filter for internal combustion engines that comprises a housing that can be opened and has an exchangeable filter element. The housing has a raw air inlet and a clean air outlet. The filter element is arranged seal-tightly between the raw air inlet and the clean air outlet and serves for separating contaminants from the intake air for an internal combustion engine arranged downstream. In this connection, the filter element is completely enclosed by the housing. When mounting the intake air filter, the housing may be closed without a filter element having been inserted. This can damage the internal combustion engine. Moreover, a filter element that is not the proper one, in particular one that is too short, may be inserted which causes undesirable performance reduction of the internal combustion engine.

The invention has the object to provide an intake air filter in which the proper mounting of the filter element can be checked with simple means.

SUMMARY OF THE INVENTION

The intake air filter according to the present invention for internal combustion engines serves for purifying air that is required for the combustion process. Such intake air filters can be employed in stationary machines, for example, compressors, or in mobile machines, for example in vehicles. The intake air filter comprises a housing that can be opened and is comprised of at least two housing parts. In this connection, one housing part can be embodied as a housing cup and the other housing part can be embodied as a housing cover. The housing parts are producible from a material that can be reshaped, for example, sheet metal, or an original-moldable material, for example, thermoplastic synthetic material. Housing parts of synthetic material can be produced particularly inexpensively because even complex housing structures can be generated in a single process step and the material, in comparison to metals, is lightweight and inexpensive. The housing has a raw air inlet and a clean air outlet. In this connection, inlet and outlet may be arranged at the same housing part or at different housing parts. Between the inlet and the outlet a filter element is arranged that seal-tightly separates the inlet from the outlet so that the sucked-in air must pass through the filter element before it can reach an internal combustion engine downstream thereof. The filter element is completely surrounded by the housing; this, on the one hand, protects the filter element with regard to mechanical damage from the environment and, on the other hand, enables a defined inflow through the raw air inlet. In order to be able to recognize in the closed state of the housing that the filter element is missing or that a filter element that is not suitable is used, the housing is provided with an additional opening which corresponds with a filter identification device. This additional opening in the housing can have any contour. For example, it can be cylindrical, oval, cross-shaped, quadrangular, or triangular. The filter identification device can be arranged inside or outside of the housing and can correspond through the opening with the other side, respectively.

In a special embodiment of the invention, the filter identification device is a viewing port that is comprised of an optically transparent material that closes off the opening. This transparent material can be, for example, transparent plastic, such as polystyrene or polycarbonate, or glass that is transparent to the human eye. Checking for a correctly mounted filter element can thus be realized by a simple visual control during mounting or during packaging. However, other materials are conceivable also which are transparent only for suitable light sources, for example, laser beams, and are opaque to the human eye. In this connection, after final assembly, a testing device with a suitable light source is required that, through the viewing port, based on contour specifications or reference points on the filter element, checks the correctly mounted filter element. Faulty or wrongly mounted filter elements can thus be recognized and sorted out.

According to an advantageous embodiment, the intake air filter comprises an annular closed filter element with a filter medium and with end disks that are connected non-detachably to its end faces. The filter element can be of a circular ring shape as well as of an oval shape. The filter medium can be comprised of any material that is known to a person of skill in the art and suitable for the use in question. The end disks can be produced of sheet metal, synthetic material or another shape-stable material. In this connection, the synthetic material can be a shape-stable thermoplastic synthetic material or a flexible elastomer, in particular PUR foam. An end disk of a shape-stable material can be e.g. fused or glued to the filter medium. In special embodiments of the end disk, a combination of several different materials can be provided also. In this connection, a combination of PUR foam with a thermoplastic center is particularly advantageous because PUR foam fuses seal-tightly with the filter medium and surrounds the center of relatively unyielding material. One of the end disks corresponds seal-tightly with the clean air outlet. The end disk that is positioned opposite the clean air outlet is supported on the housing in such a way that an uncontrolled movement of the filter element in the housing is prevented. The additional opening in the housing is arranged in the area of the end disk. In this way, parts of the end disk, parts applied to the end disk or parts arranged on the housing can pass through the opening as a filter identification device. For this purpose, it is required that the end disk has a sufficient mechanical stability in order to enable penetration of the parts into or through the opening. Therefore, by means of a visual test it can be checked whether the filter insert is correctly mounted.

It is advantageous that the opening is arranged in the area of the end disk that is arranged opposite the clean air outlet. When mounting a filter element with the correct cross-sectional shape but with a length that is too short, the filter element can be connected with the clean air outlet and the housing can be closed but the filter identification device on the end disk would not contact the opening. Thus, when the housing is closed, it is recognizable that an incorrect filter element has been installed.

According to another embodiment of the invention, the filter identification device extends away from the end disk in the direction of the opening. In this connection, the filter identification device can be embodied as a support sleeve with any cross-sectional shape as a monolithic part of the end disk. This is producible in a simple way in particular in case of shaped plastic parts. The support sleeve can be arranged at any location on the end disk. A particularly advantageous arrangement of the support sleeve is a coaxial arrangement relative to the filter element. In this way, centering and positional fixation of the filter element in the housing is achieved that is arranged on the side opposite the clean air outlet. Thus, vibrations of the filter element in operation are significantly reduced.

According to a further embodiment, the filter identification device is embodied as a pin that at least partially projects into the opening. This pin can be detachably or non-detachably connected to the end disk, for example, by fusing, adhesive connection, screw connection. In this connection, a suitable material pairing can be selected, in particular plastic end disk with metal pin. Moreover, the pin can also be of a different color than the end disk and the housing and can thus be distinguished easily with great contrast also relative to the housing; this enables a fast and simple visual check.

It is advantageous that the filter identification device comprises an elastic, in particular parallelepiped-shaped or cylinder-shaped, element that can be compressed between the filter element and the housing. In this connection, the elastic element can be e.g. glued, slipped on or metered onto the end disk. Advantageous materials are in this connection rubber mixtures, such as PUR foam or EPDM, felt materials, non-woven materials that can be compressed. Upon mounting of a correct filter element, the elastic element is clamped between the end disk and the housing in such a way that hardly any leakage flows can enter the interior of the housing through the opening. The control of the filter element is realized by means of a suitable testing tool that comprises a pin of suitable length. When performing the check, it is attempted to push the pin through the opening. When the correct filter element is present, the pin cannot penetrate farther than the material thickness. When the filter element is too short, the opening is not covered so that the pin penetrates farther than permissible into the interior of the filter and thus indicates faulty installation.

In another embodiment the filter identification device is arranged on the housing and corresponds with the end disk of the filter element. In this connection, the end disk can have a simple geometry without special configurations. Accordingly, the filter element can also be integrated into other intake air filters without filter identification. The filter identification device can be embodied as an elastic component on the inner side of the housing, e.g. glued or fused thereto. When mounting a correct filter insert, the component is then compressed and pushed against the opening. A filter insert that is too short would not press the component against the opening so that the above described testing method would recognize faulty intake air filters.

It is advantageous that the filter identification device comprises a magnetic element, for example, a metal pin or metal sheet. In this connection, the magnetic element can be pushed by the filter element from the interior against the opening or can be pushed into the opening. In case of a combination of the magnetic element, in particular metal pin, with an elastic element, in particular a spiral spring, the magnetic element is arranged positionally flexible on the housing. When the filter element is installed, the magnetic element is pushed into the opening. Upon opening, the magnetic element springs back and moves away from the opening. When mounting a correct filter element, the magnetic element is then pushed again into or against the opening. For testing the correct installation of the filter element, an inductive query can be performed. For this purpose, the intake air filter is placed onto a suitable testing device and the electrical field in the area of the opening is checked. This test of the filter element can also be performed automatically.

According to an advantageous embodiment, on the end disk a positional fixation device is arranged that corresponds with receiving contours in the housing. The positional fixation device can be embodied as a geometry that projects outwardly in radial direction. The receiving contour in the housing forms at least partially the negative contour so that the positional fixation device can be received and secured stationarily. Accordingly, a rotation of the filter element in the housing or free vibration of the filter element is prevented. With this positional fixation of the filter element in the housing, the filter identification device can be arranged at any suitable location in the area of the end disk and the filter identification is reliably ensured.

BRIEF DESCRIPTION OF THE DRAWINGS

The invention will be explained in the following in more detail with the aid of embodiments. It is show in.

EMBODIMENT(S) OF THE INVENTION

Figure 1:
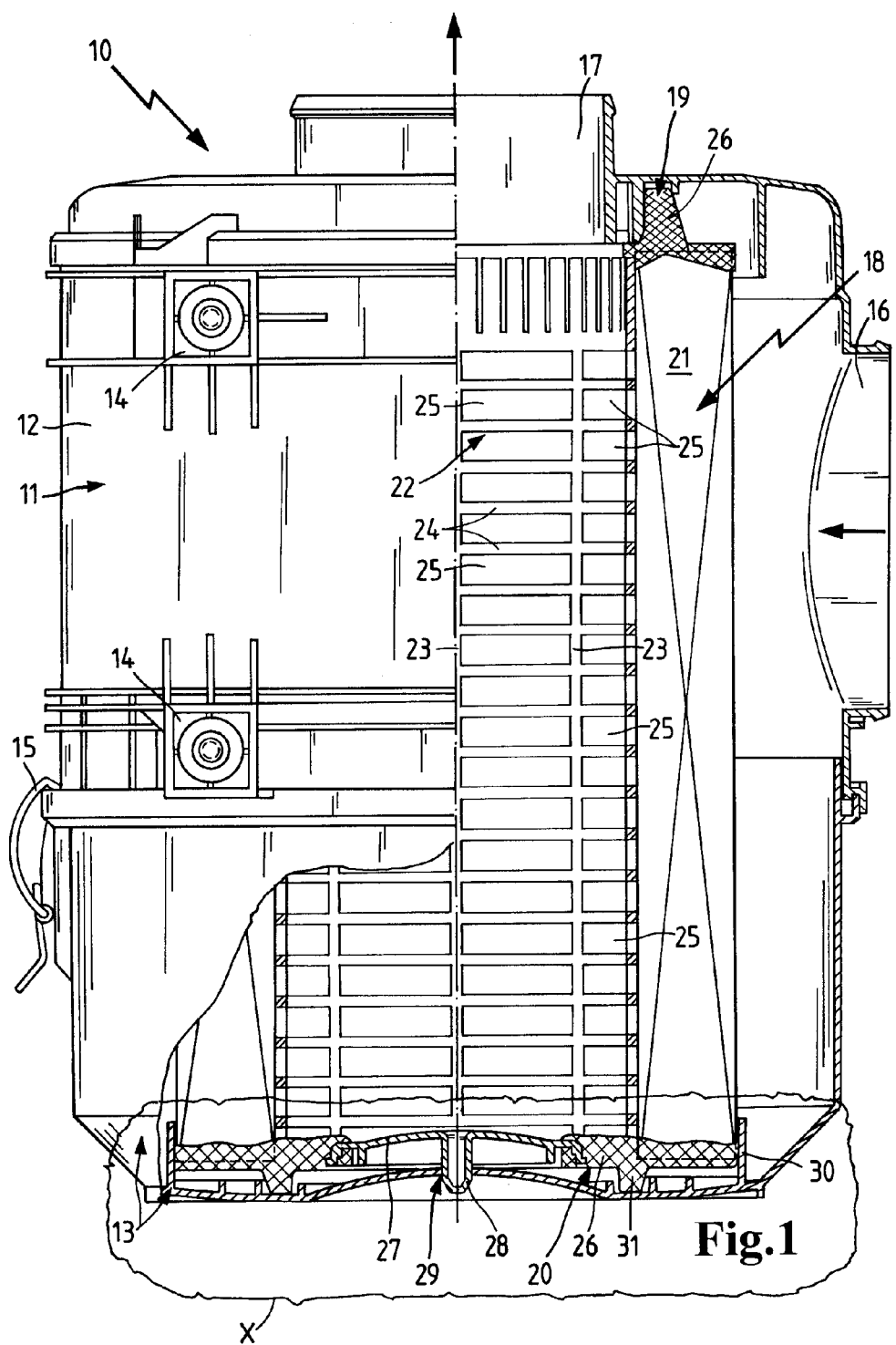
FIG. 1 an intake air filter with one half in section view.

In FIG. 1, an intake air filter 10 is illustrated with one half in section view. The intake air filter 10 is suitable for cleaning air for an internal combustion engine (not illustrated). The intake air filter 10 comprises a housing 11 that can be opened and is formed of a housing cup 12 and a housing cover 13. The housing parts 12, 13 are comprised of thermoplastic synthetic material and are produced by an injection molding process in which all contours are generated without additional processing steps. On the housing cup 12 there are fastening devices 14 on which the intake air filter 10 can be secured on appropriately designed holders (not illustrated). The housing parts 12, 13 are detachably connected to each other by means of clamping clips 15. In this connection, several clamping clips 15 are distributed about the circumference of the housing 11. In this embodiment, the housing cup 12 has a raw air inlet 16 and a clean air outlet 17. The raw air inlet 16 and the clean air outlet 17 each are embodied as a socket to which hoses or pipe conduits (not illustrated) can be connected. The housing cup 12 can also be comprised of several parts that are, for example, screw-connected or fused. In this connection, the individual parts are then more easily producible as a result of the simplified geometry. Within the housing 12 a filter element 18 is arranged such that the raw air inlet 16 is separated seal-tightly from the clean air outlet 17. The filter element 18 comprises a first end disk 19, a second end disk 20, a filter medium 21 arranged between the end disks 19, 20, and a support body 22. The filter medium 21 is comprised of a folded filter paper of a closed ring shape; the filter paper is suitable for purifying air. The support body 22 that is arranged within the filter medium 21 and thus on the outflow side is comprised of a shape-stable thermoplastic synthetic material. In this connection, the support body 22 has longitudinal ribs 23 and transverse ribs 24. Between the ribs 23, 24 there is thus a plurality of passages 25 through which the clean air can pass without further flow resistance. The support body 22 is surrounded at its end faces by the end disks 19, 20 that are partially formed of PUR foam 26. In the area of the first end disk 19 the support body 22 is slotted so that elastic radial movements, required for mounting the filter element 18 in the housing 11, are possible. The first end disk 19, in addition to the PUR foam 26, may comprise a partial area (not illustrated) of a form-stable synthetic material with which a vibration-stable connection to the housing 12 can be generated. For this purpose, this partial area can be embodied, for example, as a socket (not illustrated) that is supported in the clean air outlet 17.

The second end disk 20 comprises in addition to the PUR foam 26 a shape-stable central part 27 that is embodied as a fluid-tight shaped plastic part. This central part 27 is surrounded about its circumference seal-tightly by the PUR foam 26 and has a support sleeve 28 that is arranged concentrically to the filter element 18 and extends away from the end disk 20 in the direction toward the housing cover 13. In the mounted state, the support sleeve 28 extends through an opening 29 in the housing cover 13. Thus, when the housing 11 is closed, it can be recognized whether a filter element 18 has been correctly mounted. The end disk 20 in the mounted state is supported with its outer circumference radially on an annular geometry 30 of the housing cover 13 as well as with a bead 31 arranged at the end face in the interior of the housing cover 13. In this connection, the bead 31 is axially compressed so that axial play of the filter element in the housing 11 is prevented. When a filter element that is too short, not illustrated, is used, the end disk 20 would not contact the housing cover 13 so that the opening 29 would not be closed by the support sleeve 28. This would be easily recognizable from the exterior.

For an insufficient support of the filter element 18 on the annular geometry 30 vibrations of the filter element 18 within the housing 11 will be absorbed by the support sleeve 28 inserted into the opening 29.

Figure 2:
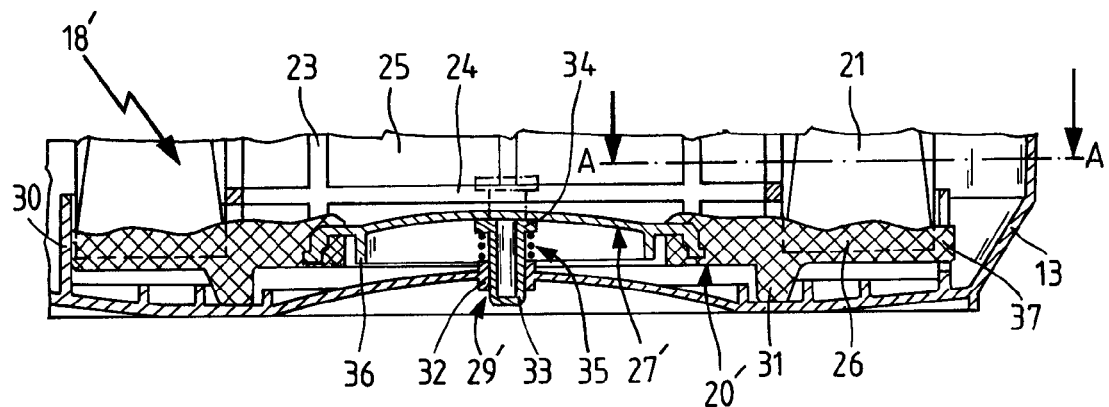
FIG. 2 an alternative embodiment of the detail X of FIG. 1.
Figure 3:
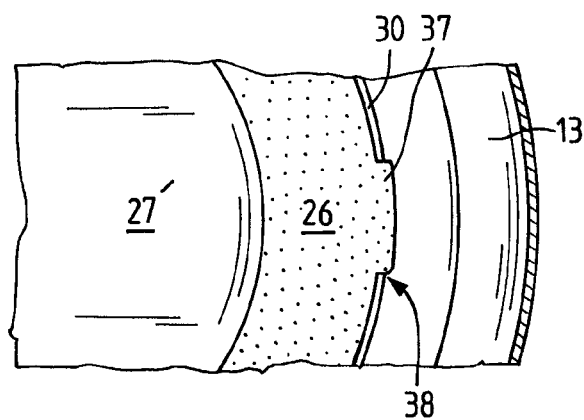
FIG. 3 a plan view along the section line A-A of the detail according to FIG. 2.

In FIG. 2 a detail X of the intake air filter 10 according to FIG. 1 is illustrated in an alternative embodiment. Same components are identified with the same reference characters. The filter housing 13 has, as in FIG. 1, a coaxially arranged opening 29'. The opening 29' has, in contrast to FIG. 1, an axial guide section 32. This guide section 32 extends away from the housing wall inwardly as well as outwardly and forms in this way a satisfactory guide surface for a sliding sleeve 33 that is embodied as a filter identification device. Accordingly, in this embodiment the filter identification device is embodied fast with the housing. In order to be able to determine the position of the sliding sleeve 33 in a simpler way, the part that projects through the opening 29' is embodied in a different color, for example, green. The sliding sleeve 33 comprises a bearing collar 34 on which a pressure spring 35 is supported. The counter bearing of the pressure spring 35 is formed by the inner end face of the guide section 32. The end disk 20' comprises, in analogy to FIG. 1, PUR foam 26 and a central part 27'. The central part 27', aside from a stabilization ring 36, is embodied as a planar slightly inwardly curved disk that is thus provided with a pressure surface that is acting on the sliding sleeve 33. In case of a correct filter element 18', the length and position of the end disk 20' is selected such that in the mounted state, with the housing 11 closed, the pressure of the central part 27' acting on the sliding sleeve 33 is sufficient in order to compress the pressure spring 35. Accordingly, the sliding sleeve is pushed through the opening 29' and is visible from the exterior. Since the end disk 20' has no centering action, on the end disk 20' in the area of the PUR foam 26 a positional fixation means 37 projecting outwardly in radial direction is integrally formed. This positional fixation means 37 engages, as shown in FIG. 3, a receiving contour 38 in the annular geometry 30. Accordingly, the filter element 18' can be inserted only in a single position into the housing 11. In other embodiments, several, in particular three, positional fixation means 37, distributed about the circumference, may be provided also which communicate with appropriate receiving contours 38. Thus, the filter element 18' can be mounted accordingly in several positions.

The filter identification device can be arranged concentrically or eccentrically. In this connection, the use of positional fixation means 37 for eccentric arrangements is particularly advantageous because in this way a precise positioning of the filter element 18' and thus function of the filter identification device is achieved.

When the filter element 18' is missing or has a length that is too short, the sliding sleeve 33 is not contacted so that no compression of the pressure spring 35 occurs. The sliding sleeve 33 is thus not pushed outwardly and remains within the interior of the housing 11 (indicated in dash-dotted lines). Accordingly, when the housing 11 is closed, it can be recognized that the filter element 18' is not the proper one.

Figure 4:
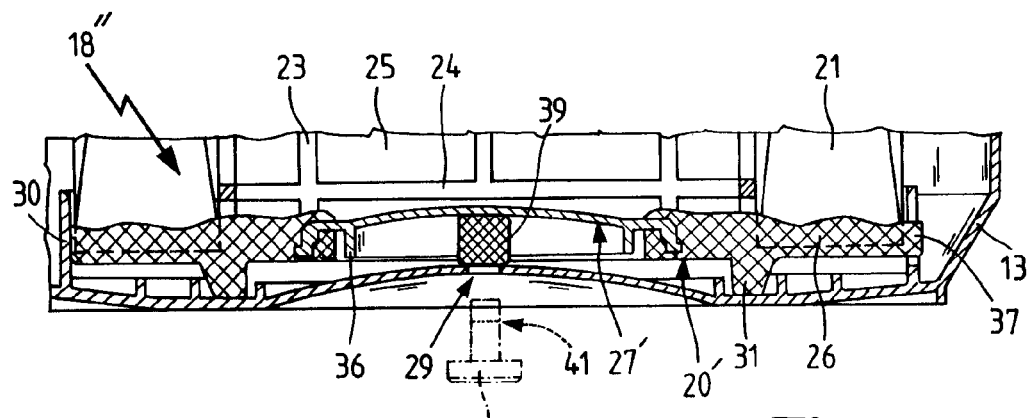
FIG. 4 an alternative embodiment of the detail X of FIG. 1.

In FIG. 4, a further alternative embodiment of the detail X according to FIG. 1 is illustrated. Same components are identified with same reference numerals. The housing 11 or the housing cover 13 correspond in its design to the housing cover 13 of FIG. 1 wherein, however, the receiving contour 38 is provided in the annular geometry 30 according to FIG. 2. The filter element 18'' correspond substantially to the filter element 18' illustrated in FIG. 2 wherein, however, coaxial to the end disk 20', a rubber element 39 is glued onto the central part 27'. In the illustrated state the filter element 18 is in the correct mounted position so that the rubber element 39 covers the opening 29. For checking the filter element 18, a testing pin 40 (illustrated in dash-dotted lines) is inserted up to the marking line 41 into the opening 29. When the testing pin 40 can be pushed in farther than the marking line 41, a faulty filter element 18 is contained in the housing 11.

Figure 5A:
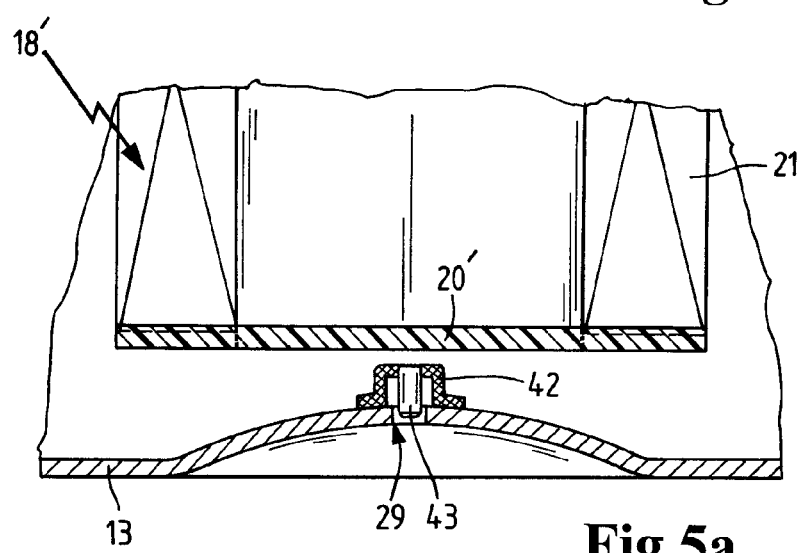
FIG. 5a an alternative embodiment of the detail X of FIG. 1 with a faulty filter element.

In FIG. 5a, a further alternative embodiment of the detail X of FIG. 1 with a faulty filter element is illustrated. Same components are identified with the same reference characters. The housing 11 corresponds substantially to the housing 11 of FIG. 1, wherein on the inner side of the housing cover 13 a rubber cap 42 is attached such that the opening 29 is covered. The rubber cap 42 comprises a magnetic metal pin 43 that is embedded by vulcanization. The filter element 18' is too short for contacting the end disk 20' of the rubber cap 42. Thus, the rubber cap 42 in the unloaded state projects into the filter interior and the metal pin 43 does not project past the wall thickness of the housing cover 13. In automatic electromagnetic testing of the intake air filter, the metal pin 43 would not generate a signal so that the intake air filter will be recognized as faulty.

Figure 5B:
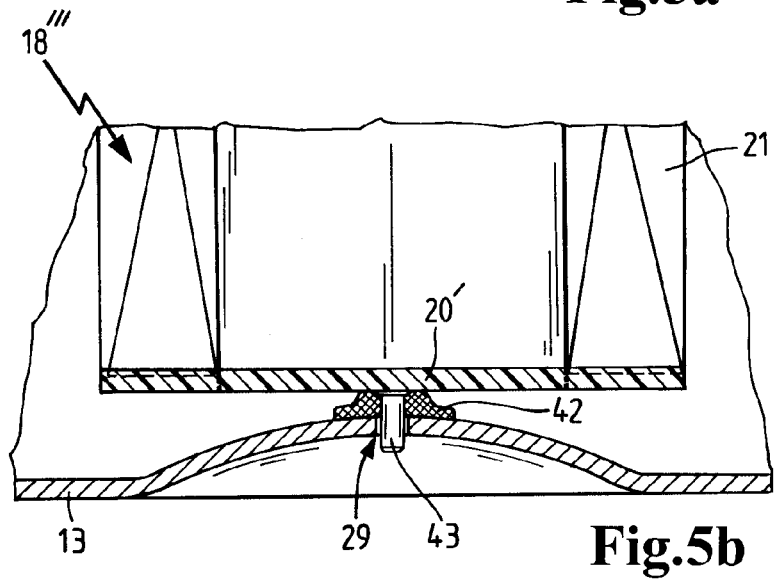
FIG. 5b the embodiment according to FIG. 5a with a proper filter element.

In FIG. 5b, the embodiment according to FIG. 5 is illustrated with a proper filter element 18''''. The rubber cap 42 is compressed by the end disk 20' and pushed against the opening 29. Thus, the metal pin 43 is pushed through the opening 29. In case of automatic electromagnetic testing, the metal pin 43 would generate a signal so that the air intake filter is recognized as a proper part.

The invention claimed is:

1. An intake air filter filtering air flow into an internal combustion engines, comprising:
   a housing enclosing a chamber therein, said housing openable to access said chamber, said housing including
      an airflow inlet; and
      an airflow outlet;
   a filter element arranged with said chamber, said filter element seal-tightly arranged between the inlet and the outlet such that airflow through said inlet must flow through said filter element to reach said outlet,
   wherein the filter said filter element includes a filter medium of an annularly closed shape,
   wherein a filter element identification device includes components provided on at least one of said filter element and said housing, said filter element identification device operable to provide an indication of a presence of a correct filter element correctly mounted within said chamber of said housing, said indication discernable from exterior of said housing when closed,
   wherein the filter element identification device includes an additional opening extending through a wall of said housing from said chamber to an exterior outside surface of said housing,
   wherein said filter element includes an end disk arranged at and secured onto an axial end face of said annular filter medium,
   wherein said filter identification device is embodied as a pin that projects outwardly away from said end disk and into said additional opening in the housing, said pin extending through said additional opening to said housing exterior, said pin visible outside of said housing at said housing exterior,
   wherein a position of said pin within said additional opening is determined by said presence of said correct filter element correctly mounted within said chamber of said housing.

2. The intake air filter according to claim 1, wherein at least one component of said filter element identification device is arranged on said end disk.

3. The intake air filter according to claim 2, wherein said pin of said filter identification device is secured to said end disk, a second end of said in extending outwardly away from said first end disk through said additional opening to said housing exterior.

4. The intake air filter according to claim 3, wherein the pin has a color that is different from that of the housing such that said pin provides a visual indication of said presence of said correctly mount filter element.

5. The intake air filter according to claim 2, wherein the filter identification device comprises
   an elastic element, said elastic element compressed between the filter element and the housing.

6. The intake air filter according to claim 5, wherein the filter identification device is arranged at and secured to the housing and interacts with the filter element.

7. The intake air filter according to claim 5, wherein said elastic element is an elastic cap arranged in said chamber and secured onto an interior of said housing and covering said additional opening at said interior of said housing,
   wherein a first end of said pin is embedded into said elastic cap, a second end of said in extending into said additional opening,
   wherein said in is a magnetic element operable to provide a signal indicative of said presence of said correctly mount filter element detectable during testing of the air filter.

8. The intake air filter according to claim 7, wherein the magnetic element is a metal pin that is arranged on the housing so as to be positionally flexible by means of the elastic element,
   wherein, when the filter element is mounted, the metal pin projects at least partially through the additional opening of the housing, and,
   wherein when the filter element is removed, the metal pin remains within the interior of the housing.

9. The intake air filter according to claim 8, wherein said end disk includes a positional fixation means projecting outwardly in a radial direction from said end disk,
   wherein said housing includes annular geometry extending axially from said housing into said chamber,
   wherein said annular geometry includes a receiving contour into which said positional fixation means engages, said engagement fixing position of said filter element within said housing into one of at least one pre-determined filter element mounting positions.

* * * * *